Sept. 12, 1961     T. MALINOWSKI ET AL     2,999,415
RANGEFINDER SIGHT WITH RANGEFINDER OF
EXTERNAL BASIS TYPE Filed July 13, 1959     2 Sheets-Sheet 1

INVENTORS
TADEUSZ MALINOWSKI
WALTER MANDLER

BY: Featherstonhaugh & Co
ATTORNEYS

INVENTORS
TADEUSZ MALINOWSKI
WALTER MANDLER
ATTORNEYS

United States Patent Office 2,999,415
Patented Sept. 12, 1961

2,999,415
RANGEFINDER SIGHT WITH RANGEFINDER OF EXTERNAL BASIS TYPE

Tadeusz Malinowski and Walter Mandler, Midland, Ontario, Canada, assignors to Ernst Leitz Canada Limited, Midland, Ontario, Canada
Filed July 13, 1959, Ser. No. 826,545
4 Claims. (Cl. 88—2.2)

The present invention relates to an optical instrument which enables the presetting of the elevation angle of a weapon whose ballistic is known, using a measurement of range of the target as an essential intermediate operation. The rangefinding system used in this instrument belongs to the type of rangefinding systems known as rangefinders with external basis, in which the range is determined by measuring angles subtended by the target, assuming that the real dimensions of the target are known: for example, when the target is a rod of known length situated perpendicularly to the aiming line.

The rangefinding systems of this kind are usually built in the form of a telescope having a reticle with engraved divisions in terms of angles or calibrated to read directly in terms of ranges (stadimetric scale).

The rangefinding systems of this type, however, are useless when the target is of more complicated shape than a rod, for example of rectangular form in plan view (for example, a vehicle), and when its angular position in relation to the aiming line is variable.

Accordingly, it is an object of this invention to provide a rangefinder sight capable of measuring the range, whereby the elevation angle of a weapon may be preset for targets which are of rectangular form of known dimension in plan view (e.g. vehicles) and to do so regardless of the angular position of the target in relation to the aiming line.

In certain cases the length and width of the target are practically international standards. In such particular cases a special rangefinder sight can be built which is applicable only for targets having these standard dimensions.

The instrument according to this invention preferably includes a rangefinding system and an elevation setting system combined.

Figure 1:
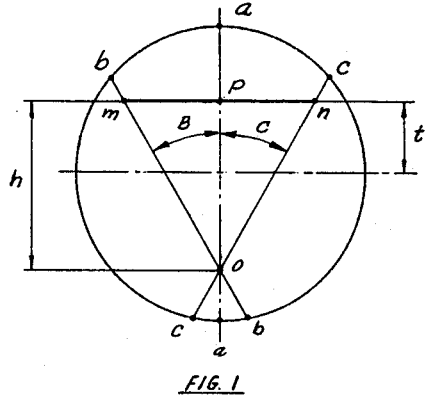
FIGURE 1 is a diagrammatic illustration of a reticle of one of several possible designs of rangefinder with external basis.

FIGURE 1 diagrammatically illustrates an embodiment of the present instrument, based on the above described principle, which can be used for the measurement of ranges of objects having only one dimension to be taken into consideration (for example, a rod of known length). FIGURE 1 represents a reticle in the field of vision of a telescope in which three fixed straight lines are engraved. Line $aa$ is vertical. Two other lines $bb$ and $cc$ pass through a certain point 0 arbitrarily selected on the line $aa$, and form the angles B and C, respectively, with line $aa$.

The telescope, as described, can be aimed at the target having a form of a horizontal rod of known length $D=MN$ (not shown). The image of this rod appears in field of vision as a horizontal line $$d=mn$$

The telescope can be aimed so that two tilted lines $bb$ and $cc$ frame both ends of the image $mn$, as shown in FIGURE 1. This occurs when the image is on certain height $h$ in relation to the point 0.

If R is the range and $f$ is the focal length of the objective of the telescope we have $$d=\frac{f}{R}D$$

If B and C are the angles made by lines $bb$ and $cc$ with the vertical line $aa$ we have $$\frac{mp}{h}=\tan B$$

$$\frac{pn}{h}=\tan C$$

$$\frac{mn}{h}=\tan C+\tan B$$

or $$hR=\frac{fD}{\tan C+\tan B} \qquad (1)$$

If $$C=B=C_0=\text{constant}$$

$$hR=\frac{fD}{2\tan C_0}=\text{constant}$$

The height $h$ is then inversely proportional to the range R, all other factors being constant. To every range R of the target rod D corresponds one only value of $h$. Therefore, divisions and terms of ranges can be engraved on vertical line $aa$ and the system can work as a rangefinder.

The instrument, as described, can be used after introducing some changes for measuring ranges to objects having rectangular form in plan view (for example, vehicles).

Figure 2:
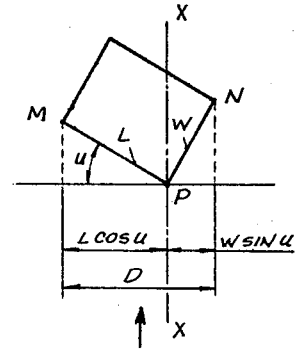
FIGURE 2 is a diagrammatic plan view of a rectangular target and shows the relationship between both sides of the target and their projections on a plane perpendicular to the aiming line.

FIGURE 2 shows schematically a plan view of a rectangular object (vehicle) having length L and width W and so positioned that its longer side L makes an angle $u$ with a plane perpendicular to the aiming line XX.

The total apparent horizontal length of the vehicle as viewed along aiming line XX can be expressed $$D = L \cos u + W \sin u \quad (2)$$

Introducing this value into Formula 1 we get $$hR = f\frac{L \cos u + W \sin u}{\tan C + \tan B} \quad (3)$$

The instrument can be used for measurement of ranges when $$\frac{L \cos u + W \sin u}{\tan C + \tan B} = \frac{hR}{f} = \text{constant} \quad (4)$$

Condition (4) can be satisfied when angles B and C are variable. To evaluate their values and to define the relationship between them reference is made to FIGURE 3. It shows a field of vision of a telescope in which the image of the vehicle is represented by two rectangles $l$ and $w$, each corresponding to one side of the vehicle. The tops of corners M, P and N of the vehicle (FIGURE 2) are represented as their images $m$, $p$ and $n$, aligned on a straight horizontal line. The image of total apparent length D (Formula 2) is then $d = mn$, and it is variable with $u$.

Figure 3:
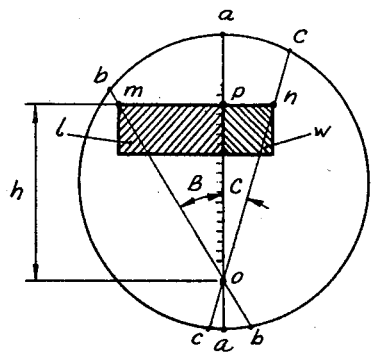
FIGURE 3 is a diagrammatic illustration of a reticle of the instrument in accordance with the present invention.

From FIGURE 3 we have $$\frac{mp}{h} = \tan B$$

$$\frac{pn}{h} = \tan C$$

On the other hand we have $$mp = \frac{f}{R} L \cos u$$

$$pn = \frac{f}{R} W \sin u$$

hence $$\tan B = \frac{f}{hR} L \cos u \quad (5)$$

$$\tan C = \frac{f}{hR} W \sin u \quad (6)$$

$$\frac{mp}{pn} = \frac{\tan B}{\tan C} = \frac{L}{W \tan u} \quad (7)$$

The formula 7 does not contain the range R. It means that the ratio $$\frac{mp}{pn}$$

depends on angle $u$ only and the proper angles B and C can be set when the target is located at any range R.

As a result the sum: $\tan B + \tan C$ in Formula 1 can be practically defined when the target is at any range and it remains constant as long as $u$ is constant. Also to each value of $n$ corresponds one only value of this sum. Since this sum is practically known, the case becomes identical with the case of horizontal target rod and therefore the instrument can work as a rangefinder.

By a simple mechanical arrangement described below, it is possible to link the rotations of lines $bb$ and $cc$ in such a way that for each angle $u$ the angles B and C are set according to Equations 5 and 6. In other words, by rotating one of two lines only, for example the line $bb$, another line $cc$ is also rotated by means of mechanical linkage. In this way a series of pairs of angles B and C can be set, each pair corresponding to a certain value of the angle $u$. From this series one pair only is to be selected, which corresponds to the real value of the angle $u$ under which the vehicle is positioned. This angle can be expressed in terms of the ratio $$\frac{mp}{pn}$$

as shown in Formula 7, where $mp$ and $pn$ are lengths, visible in field of vision. Their magnitudes and their ratio are essential in selecting a proper pair of angles B and C in practical process of measurement.

To select this pair it is necessary and sufficient to bring the image $mn$ on such a level, and to rotate the lines $bb$ and $cc$ to such a degree that these lines pass through corners $m$ and $n$ of the target (provided that line $aa$ passes always through the corner $p$).

In practical embodiment of the range finding system the relationship between angles $B$ and $C$, or between rotations of lines $bb$ and $cc$ can be secured by an appropriate linkage between these two rotations. One of possible examples of such linkage is shown on FIGURE 4.

Item 1 represents the area of the reticle of the telescope on which a fixed vertical line $aa$, bearing range divisions, is engraved.

The line $bb$ is connected with a frame 2 rotatable by means of a driving lever 3 and the line $cc$ is connected with a frame 4 and rotatable by means of the driving lever 5.

The links 6 and 7 connect the ends of levers 3 and 5 with a roller 8, which, in its movement is guided by a cam 9. Since for each pair of angles B and C, as per Equations 5 and 6 the position of roller 8 can be found, the cam 9 can be cut so as to satisfy the above equations for any pair of angles B and C. The roller 8 is pressed towards the cam 9 with spring (not shown), and is driven by the forked lever 10 (or in any other way) which lever is, in turn, driven by a knob 11.

Figure 5:
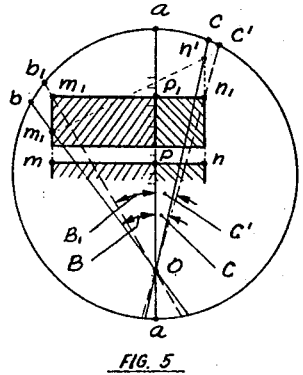
FIGURE 5 is a diagrammatic illustration of the reticle according to the invention in the process of measuring range.

To measure the range of a vehicle the following operations have to be performed:

(1) Aim the telescope on the vehicle so that in its field of vision the fixed vertical line $aa$ of the reticle passes through the central corner $p$ of the vehicle (see FIGURE 5).

(2) While moving the telescope vertically (always keeping corner $p$ on line $aa$) look for points in which verticals from corners $m$ and $n$ intersect lines $bb$ and $cc$ (points $m'$ and $n'$). In general these points do not lay on the same horizontal (dotted line $m'n'$).

(3) Rotate the knob 11 introducing new values $B_1$ and $C_1$ of angles B and C and repeat the operation as above. This operation should be repeated until both lines $bb$ and $cc$ intersect corners $m$ and $n$ of the vehicle in points $m_1$ and $n_1$—situated on the common horizontal $m_1p_1n_1$. In this case point $p_1$ shows a proper division of range.

In above description it is assumed that the longer side L of the vehicle is on the left from shorter side W, i.e. that angle $u$ is between 0° and 90°.

In case angle $u$ is between 90° and 180° a second cam is to be provided which is symmetrical to the cam 9 (not shown). One of the cams is in use when $u$ is between 0° and 90° (while the second one is switched off), and the other one when $u$ is between 90° and 180° (while the first one is switched off). The switching mechanism (not shown) can be of any type.

Figure 6:
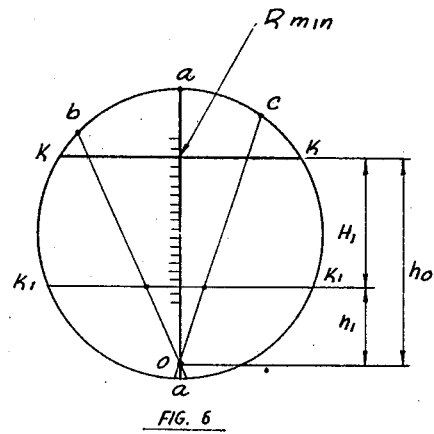
FIGURE 6 is a diagrammatic illustration of the reticle according to the invention in connection with the setting of an elevation angle.

Proceeding to the elevation setting part of the instrument, reference is made to FIGURE 6, representing the reticle of the instrument with vertical line $aa$ and rotatable lines $bb$ and $cc$.

Suppose that the minimum range for which the instrument is built is $R_0$ for which $h = h_0$. For any other range it is $$h = \frac{R_0}{R} h_0$$

This gives the difference between elevation angles for ranges R and $R_0$ as $$\Delta = \frac{H}{f} = \frac{h_0 - h}{f} = \frac{h_0}{f}\left(1 - \frac{R_0}{R}\right) \tag{8}$$

Figure 7:
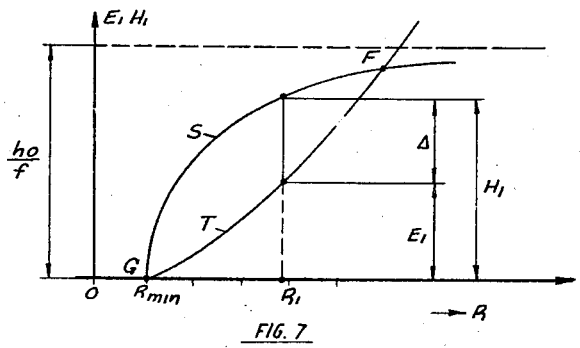
FIGURE 7 is a graph showing the relationship between the ballistic curve of a weapon and the elevation curve of the rangefinding system in accordance with the invention.

This equation is represented on FIGURE 7 as a curve S.

The instrument could be used directly as a sight for a weapon when the ballistic curve of this weapon, having a general form of equation $$E = f(R) \tag{9}$$

is identical with curve (8).

In reality, however, the ballistic curve of the weapon has a shape approximately shown on FIGURE 7 as a curve T. Knowing both curves (8) and (9) a discrepancy $$\Delta = \frac{H}{f} - E \tag{10}$$

between both elevations can be found for any range R.

The curve S can be so selected (by selecting a proper value of $h_0$ in Equation 8) that it intersects the real ballistic curve T of the weapon, for example, in G, corresponding to a certain rang $R_g$ supposed to be between minimum and maximum ranges for which the instrument is built. For this range, the discrepancy between elevation $E_R$ found in rangefinding operation (curve S) and elevation E required by real ballistic curve of the weapon is $$\Delta = E_B - E_R = 0$$

For all other ranges this discrepancy is $$\Delta = E_B - E_R = 0$$

Its real value is positive when $R > R_g$. In this case when aiming at $E_R$, elevation indicated by the target in rangefinding operation, the elevation of the barrel of the weapon is too small. It must be compensated by positive discrepancy $\Delta$ to become a real elevation corresponding to the ballistic curve.

Let $kk$ in FIGURE 6 be a horizontal line passing through a division corresponding to minimum range $R_0$. We assume also that the body 12 of the instrument is rigidly connected with the barrel 13 of the weapon (FIGURE 8) and that this line $kk$ is inserted in a frame 14 and can be shifted vertically, by means of an appropriate mechanical arrangement, to the position $k'k'$ (FIGURE 6) which position corresponds to certain range $R_1$ on curve S.

The necessary shift $H_1$ is usually too high to fit the real ballistic T. By tilting down the barrel 13 of the weapon together with the instrument by an angle $\Delta$ the real elevation of the barrel can be made to correspond to the elevation $E_B$ prescribed by ballistic T, but the image of the target is then no longer on the level of the line $k'k'$.

To bring it back to this level the optical deviator of any type can be inserted in the optical system which compensates for the tilt $\Delta$.

To each range R there corresponds only one value of H and only one value of $\Delta$. Therefore H and $\Delta$ can be linked mechanically by means of an appropriate mechanism including a cam. When this linkage is properly done and adjusted then, to obtain the proper elevation E of the weapon, it is necessary and sufficient to make the range measuring operations as described above, and bring at the same time a movable line $kk$ on the level of the image of the target.

Figure 8:
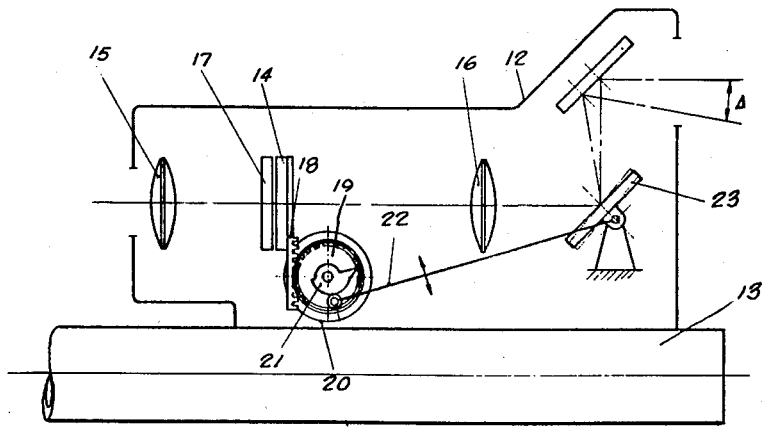
FIGURE 8 is a schematic longitudinal cross-sectional view of the instrument in accordance with the invention mounted on a weapon and shows an elevation compensating arrangement.

An example of a practical embodiment of such an arrangement is shown schematically in FIGURE 8. In this figure the instrument 12 is mounted on the barrel 13 of a weapon. Item 15 is an eyepiece and 16 an objective lens of the telescopic optical system. Item 17 is a frame containing a reticle for rangefinding as per FIGURES 4 and 5. Item 14 is a frame containing a movable horizontal line $kk$, which frame can be shifted vertically by means of a rack 18 and pinion 19 which, in turn, can be rotated from outside by means of a knob 20. On an axis common with knob 20 and pinion 19 a cam 21 is provided which, by intermediance of a lever 22, rotates a mirror 23 which mirror gives a necessary compensating angle $\Delta$ of the whole image.

Figure 4:
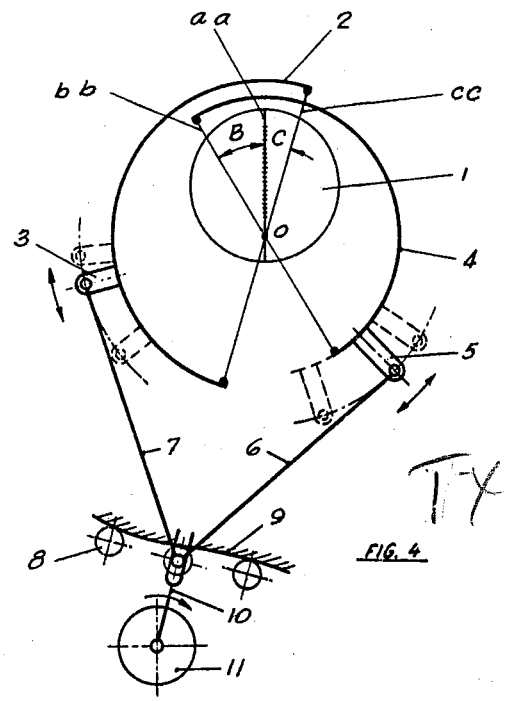
FIGURE 4 is a diagrammatic representation of the general lay-out of the range measuring arrangement in accordance with the invention.

In practical application to preset a proper elevation angle of the barrel 13, the following operations have to be carried out:

(1) Measuring the range of the target as described above and shown in FIGURE 5 using the knob 11 (FIGURE 4).

(2) By rotating the knob 20 bring the movable line $kk$ (FIGURE 6) on the level corresponding to the measured range (see level $m_1n_1$, FIGURE 5).

(3) Align the target on the line $kk$ in its new position and pull the trigger.

What we claim as our invention is:

1. An optical rangefinder-sight comprising in combination a rangefinding system and sighting system, whose rangefinding system is of the external basis type to be applied for targets having a form of horizontal rod of known length, said rangefinding system comprising a telescopic optical system including a reticle having a fixed vertical line bearing divisions in terms of ranges and two tilted lines passing through a point arbitrarily selected on said vertical line and forming fixed angles with said vertical line; whereby when the said two tilted lines on the reticle embrace the two opposite ends of the image of the target rod, the image of the said target rod intersects the said vertical line of the reticle at a height which indicates the proper range division, corresponding to the real range of the target.

2. An optical rangefinder-sight comprising in combination a rangefinding system and sighting system, whose rangefinding system is of the external basis type to be applied for targets having in plane view a rectangular form of known sides (length and width) said rangefinding system comprising a telescope system including a reticle having a fixed vertical aiming line bearing divisions in terms of ranges and two other lines rotatable about a point arbitrarily selected on said vertical line, the rotations of said lines being coupled together by means of an externally operated linking mechanism including cam means, said coupling providing for rotation of said lines such that the amount of rotation of each line is proportional to the apparent angle subtended by a corresponding visible side of the target in its various angular positions in relation to the aiming line, whereby; when the telescope is aimed on the target such that the image of the target intersects said vertical line at a certain height in the field of view, and said mechanism is adjusted such that said rotatable lines embrace the opposite end corners of the target while simultaneously the said fixed vertical line passes through a central corner of said target; the height of the intersection of the said image of the target with the said vertical line indicates the proper range division, corresponding to the real range of the target and, said mechanism, when the telescope is aimed on the target, can be set by said outside operation so that a certain height in field of vision both said rotatable lines do frame the end corners of the target, while, simultaneously, the said fixed vertical line passes through its central corner, said height indicating the proper range division, corresponding to the real range of the target.

3. An optical rangefinder-sight as set forth in claim 2 in which, in the mechanism coupling together the rotations of two rotatable lines of the reticle, two cams are provided; one of said cams being used at a time while the other is switched off, one of said cams to be used when the longer side of the target is visible on the left of its shorter side and the other to be used when the longer side of the target is visible on the right of its shorter side.

4. An optical rangefinder-sight as set forth in claim 3 which is rigidly connected with the barrel of a firing weapon and which includes a sighting system comprising, in combination, an additional reticle vertically movable and having one horizontal line, said reticle being built into the telescope of the rangefinding system and an optical deviating device to compensate for discrepancies between elevation angles of the weapon prescribed by the ballistic curve of the weapon and the elevation angles corresponding to the divisions in terms of ranges appearing in the original reticle of the telescope of the rangefinding system, said deviating device being located in front of the said telescope and being composed of two or more reflecting faces, one of which is rotatable in a vertical plane, and its rotations being coupled with the vertical movements of the said additional reticle by means of a linking mechanism including a cam, and operable from outside of the instrument.

References Cited in the file of this patent

UNITED STATES PATENTS

| | | |
|---|---|---|
| 2,384,098 | Klemperer | Sept. 4, 1945 |
| 2,448,965 | Drayer | Sept. 7, 1948 |
| 2,811,894 | Braker | Nov. 5, 1957 |
| 2,887,774 | Toczylowski | May 26, 1959 |